(12) United States Patent
Djelassi (10) Patent No.: US 10,625,873 B2
(45) Date of Patent: Apr. 21, 2020

(54) SYSTEM FOR CONTROLLING A CONTROLLED PARAMETER

(71) Applicant: SAFRAN AIRCRAFT ENGINES, Paris (FR)

(72) Inventor: Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 90 days.

(21) Appl. No.: 15/752,628

(22) PCT Filed: Aug. 18, 2016

(86) PCT No.: PCT/FR2016/052090
§ 371 (c)(1),
(2) Date: Feb. 14, 2018

(87) PCT Pub. No.: WO2017/029456
PCT Pub. Date: Feb. 23, 2017

(65) Prior Publication Data
US 2019/0031359 A1   Jan. 31, 2019

(30) Foreign Application Priority Data
Aug. 19, 2015  (FR) .................................. 15 57808

(51) Int. Cl.
*B64D 31/00* (2006.01)
*B64D 31/06* (2006.01)
(Continued)

(52) U.S. Cl.
CPC ............... *B64D 31/06* (2013.01); *F02C 9/00* (2013.01); *G05B 13/042* (2013.01); *F02C 6/206* (2013.01);
(Continued)

(58) Field of Classification Search
CPC . B64C 31/00; B64C 31/06; F02C 9/00; F02C 6/206; G05B 13/00; G05B 13/042; F05D 2270/02
See application file for complete search history.

(56) References Cited

U.S. PATENT DOCUMENTS 4,980,835 A  * 12/1990  Lawrence ............. B64C 27/325
                                                    244/17.11
6,539,290 B1    3/2003  Vos
(Continued)

FOREIGN PATENT DOCUMENTS

DE    10 2005 004 632 B3    5/2006
EP        1 523 102 A2      4/2005
(Continued)

OTHER PUBLICATIONS

French Preliminary Search Report dated Jun. 9, 2016 in Patent Application No. FR 1557808 (with English translation of categories of cited documents), 3 pages.
(Continued)

*Primary Examiner* — Yonel Beaulieu
(74) *Attorney, Agent, or Firm* — Oblon, McClelland, Maier & Neustadt, L.L.P.

(57) ABSTRACT

A control system for controlling a controlled parameter of an aeronautical equipment device, the controlled parameter being governed by an operating law linking the controlled parameter to a command and to a plurality of input parameters, the control system including a control loop controlling the controlled parameter to a setpoint with the control of the device by the command, the system including an operating law compensation module and a determination module determining a local gain configured to determine the local gain of a static part of a model of the operating law representative of the gain of the controlled parameter in response to a variation in the command in a stabilised
(Continued)

operating regime of the operating law, the operating law compensation module using the inverse of the local gain.

7 Claims, 8 Drawing Sheets

(51) Int. Cl.
  *G05B 13/00* (2006.01)
  *F02C 9/00* (2006.01)
  *G05B 13/04* (2006.01)
  *F02C 6/20* (2006.01)

(52) U.S. Cl.
  CPC .... *F05D 2220/323* (2013.01); *F05D 2270/02* (2013.01); *F05D 2270/335* (2013.01); *F05D 2270/44* (2013.01); *F05D 2270/71* (2013.01)

(56) References Cited

U.S. PATENT DOCUMENTS

| | | | | |
|---|---|---|---|---|
| 9,004,973 | B2* | 4/2015 | Condon | A63H 13/00 446/37 |
| 9,011,250 | B2* | 4/2015 | Condon | A63H 13/00 463/40 |
| 9,922,282 | B2* | 3/2018 | Weller | G06F 11/00 |
| 10,258,888 | B2* | 4/2019 | Pedersen | A63H 27/12 |
| 10,272,994 | B2* | 4/2019 | Wang | B64C 39/024 |
| 10,307,667 | B2* | 6/2019 | Condon | G05D 1/0033 |
| 10,309,330 | B2* | 6/2019 | Cline | F02D 41/1402 |
| 2003/0191561 | A1 | 10/2003 | Vos | |
| 2005/0077960 | A1 | 4/2005 | Kim et al. | |
| 2006/0241786 | A1 | 10/2006 | Boe et al. | |
| 2010/0017093 | A1 | 1/2010 | Mahmood | |

FOREIGN PATENT DOCUMENTS

| | | |
|---|---|---|
| EP | 1 523 102 A3 | 4/2005 |
| EP | 2 154 588 A2 | 2/2010 |
| EP | 2 154 588 A3 | 2/2010 |
| WO | WO 01/92972 A2 | 12/2001 |
| WO | WO 01/92972 A3 | 12/2001 |

OTHER PUBLICATIONS

International Search Report dated Nov. 16, 2016 in PCT/FR2016/052090, 3 pages.

Ahmet M. Hava, et al., "Carrier-Based PWM-VSI Overmodulation Strategies: Analysis, Comparison, and Design" IEEE Transactions on Power Electronics, vol. 13, No. 4, XP011043188, Jul. 1, 1998, pp. 674-689.

* cited by examiner

SYSTEM FOR CONTROLLING A CONTROLLED PARAMETER

GENERAL TECHNICAL FIELD AND CONTEXT OF THE INVENTION

The field of the present invention is that of systems for controlling a regulated parameter of an aeronautical equipment device and applies advantageously to an aircraft propulsion device. Operating a device equipping an aircraft, such as an engine, is highly complex, involving many parameters, and restrictions on security specific to aeronautics need particularly precise and secure control. The invention applies advantageously to turboprops and more particularly to determination of a command for servo-controlling the power of such a turboprop and to servo-control the speed of its propeller.

Figure 1:
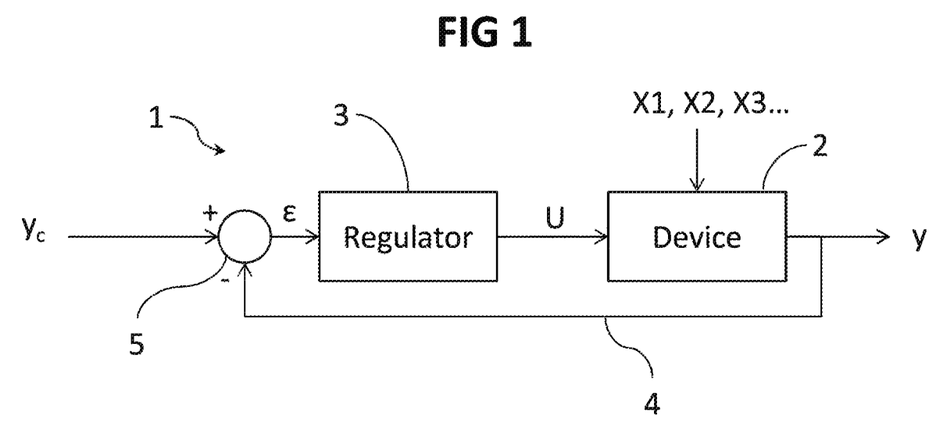
FIG. 1, already discussed, is a drawing illustrating a regulation control system by servo-control at a setpoint of a regulated parameter of a physical device.

More generally, FIG. 1 illustrates a regulation control system 1 by servo-control at a setpoint $Y_c$ of a regulated parameter Y of a physical device 2. The control aims at maintaining at least one physical magnitude, called regulated parameter, equal to a targeted value, called setpoint, by action on a regulating variable by means of a command U. The system 1 comprises a regulator 3 delivering said command U and inputting the output ε of a differentiator 5 delivering the difference between a loop back 4 of the regulated parameter Y and the setpoint $Y_c$.

Such a system is currently being used in automation for servo-controlling the regulated parameter Y at the setpoint $Y_c$. The difficulty is determining the transfer function of the regulator 3. In fact, it is this transfer function which determines the behavior of the device 2, via the command U. For simple devices, it is easy to determine the form of the transfer function of the regulator 3 to achieve a response from the device 2 which satisfies the requisites for rapidity and security. But as long as the device gets complex, designing an acceptable regulator 3 becomes complicated, or even impossible.

Especially for devices 2 whereof the output, i.e., the regulated parameter Y, depends apart from the command U, on many variable parameters, called input parameters, conventional techniques of determining the transfer function of the regulator 3 no longer apply. This is true in particular when the relationships between the command U, the input parameters and the regulated parameter Y involve non-linearities.

PRESENTATION OF THE INVENTION

The aim of the present invention is to rectify the disadvantages of the prior art by proposing a system for controlling a regulated parameter of an aeronautical equipment device, said regulated parameter being governed by an operating law linking said regulated parameter to a command and to a plurality of input parameters, said regulation control system comprising a regulation loop servo-controlling said regulated parameter at a setpoint b means of the command controlling the device,
remarkable in that the system comprises a compensation module of the operating law and a determination module of a local gain configured to determine the local gain of a static part of a model of the operating law representative of the gain of said regulated parameter in response to a variation in said command in a steady operating state of said operating law, said static part of the model of the operating law combining the time-independent relations between the regulated parameter, the command and the plurality of input parameters, said model of the operating law also comprising a dynamic part combining the time-dependent relations between the regulated parameter, the command and the plurality of input parameters, said compensation module of the operating law involving the inverse of said local gain.

Inclusion in a compensation module of the operating law of the inverse of a local gain thus determined in this way compensates the operating law even in the event of non-linearities in the operating law. The regulated parameter can be servo-controlled by dispensing with these non-linearities.

The system is advantageously completed by the following features, taken singly or in any of their technically possible combinations:
- the local gain is calculated from the values taken by the outputs of a static part of a model of the operating law, for at least two separate values of the command U in keeping the input parameters constant;
- the difference between the two separate values of the command is less than 0.25% of the range of variation in said command and/or the difference between the two separate values of the command corresponds to a variation in said command causing a variation in the regulated parameter less than 1% of the range of variation in aid regulated parameter;
- the determination module of the local gain is configured to deliver a predetermined saturation value when the local gain calculated by said determination module is below a predefined value;
- the determination module of the local gain is configured so that at least with each change of the command and/or the input parameters, a new local gain is determined to reflect said changes;
- the regulation loop comprises a regulator constituted in series by a corrector and of said compensation module of the operating law, the command corresponding to the output of the regulator;
- the compensation module of the operating law also comprises a first transfer function of the inverse of the dynamic part of the model of the operating law;
- the model of the operating law comprises an invertible part and a non-invertible part, and the compensation module of the operating law comprises a static compensation which corresponds to the inverse of the local gain K and a dynamic compensation comprising a forward path and a feedback path constituting a feedback loop, wherein the forward path comprises a second transfer function involving the inverse of the invertible pan of the model of the operating law and the feedback path comprises a third transfer function involving the non-invertible part of the model of the operating law.

The invention also relates to an assembly comprising an aeronautical equipment device and a system for controlling said device according to the invention.

PRESENTATION OF THE FIGURES

The invention will be more clearly understood from the following description which relates to a preferred embodiment given by way of non-limiting example and explained with reference to the appended schematic drawings, in which.

In the different figures, identical reference numerals designate similar or equivalent elements.

DETAILED DESCRIPTION

In the present description, module means a set of technical means carried out to satisfy the function of the module. Typically, these are equations and calculations whereof the functions are linked and can be combined. The present invention is carried out by a computer and its accessories (memory, input/outputs) which constitute the structural part of the regulation control system. Also, to the extent where a model is reflected by a set of equations, the terms transfer function or model could be used interchangeably to designate a model, though the term model implies the need to consider an operating law of a physical system modelled by said model.

Figure 2:
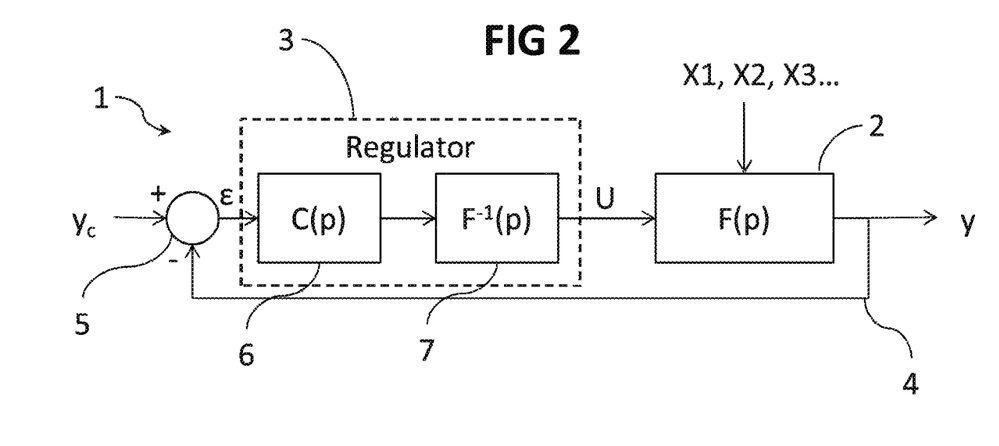
FIGS. 2, 3 and 4 are drawings illustrating, a regulation control system by servo-control at a setpoint of a regulated parameter of a physical device according to possible embodiments of the invention.

FIG. 2 shows the principle of a system 1 according to the invention. As for FIG. 1, this is a regulation control system 1 by servo-control at a setpoint $Y_c$ of a regulated parameter Y of a physical device 2.

The system 1 comprises a regulation loop servo-controlling the regulated parameter Y at a setpoint $Y_c$ by controlling the device 2 by the command U. This regulation loop comprises a regulator 3 delivering the command U and inputting the output of a differentiator 5 delivering the difference between a loop back 4 of the regulated parameter Y and the setpoint $Y_c$.

The regulated parameter Y is governed by an operating law linking said regulated parameter Y to a command U and to a plurality of input parameters X1, X2, X3 . . . . This operating law can be modelled by a transfer function F(p), mathematical model of the relationship between the command U, the input parameters $X_i$ and the regulated parameter Y.

The regulator 3 is constructed from two modules in series: a corrector 6 with a transfer function C(p) and a compensation module 7 of the operating law with a transfer function $F^1(p)$. As presented, the corrector 6 and the compensation module 7 are preferably in series in the forward path of the regulation loop, with the corrector 6 upstream of the compensation module 7. Yet other configurations are possible. The command U corresponds to the output of the regulator 3, and therefore to the output of the corrector 6 or of the compensation module 7.

The transfer function $F^{-1}(p)$ of the compensation module 7 is the inverse of the transfer function F(p) modelling the device 2 and therefore corresponds to the inverse of the model of the operating law. Because of this, since $F^{-1}(p) \cdot F(p) = 1$, the compensation module effectively compensates the operating law. This is about correction by inverse model. It aims to use in the correction path online inversion of the model of the operating law of the device 2 so as to compensate the poles and the zeros of the process as well as the gain static. The inversion of the model of the operating law allows complete theoretical compensation, but depends on a modelling representative of the operating law. Via this compensation, the corrector 6 can be easily conceived so as to attain the dynamic and the targeted accuracy.

However, inversion of the transfer function of the model of the operating law needs that the transfer function to be entirely invertible, or the non-invertible elements to be negligible. As a result, some physical processes are intrinsically non-invertible, and also modelling can reveal non-linearities for better reflecting the real process.

In fact, in practice the transfer function F(p) modelling the operating law is never explicit. The automation engineer often has a model of physical equation type f with a dependency of the regulated parameter Y not only on the command U but also on several input parameters $X_i$:

$$Y = f(U, X_1, X_2, X_3, \ldots)$$

with Y the parameter to be regulated, i.e., the output delivered by the model of the operating law, U the command, and X1, X2, X3 . . . being input parameters which influence the operating law. The model of the operating law can be determined by the physical relationships between different known variables, i.e., by analysis, and/or by identification. The transfer function F(p) is determined from this model to reflect its operation.

In general, the model f of the operating law comprises two parts: a static part and a dynamic part. The static part of the model of the operating law combines the time-independent relationships between the regulated parameter Y, the command U and the plurality of input parameters $X_i$. The dynamic part of the model of the operating law combines the time-dependent relationships between the regulated parameter Y the command U and the plurality of input parameters $X_i$.

The model of the operating law can be noted as:

$$Y = K(U, X_1, X_2, X_3, \ldots) \cdot f'(U, X_1, X_2, X_3, \ldots)$$

$K(U, X_1, X_2, X_3, \ldots)$ represents the static part, representative of the operating law in steady state, i.e., when the command U and the plurality of input parameters $X_i$ are constant in the time for sufficiently long so that the effects of the transitory phases are negligible. In this way, in steady state:

$$Y = K(U, X_1, X_2, X_3, \ldots)$$

The elements of the static part are determined either by identification in steady state or by analyze.

$f'(U, X_1, X_2, X_3, \ldots)$ represents the dynamic part, representative of the effects on the operating law of temporal variations of the command U and/or of the plurality of input parameters $X_i$. In steady state:

$$f'(U, X_1, X_2, X_3, \ldots) = 1$$

This dynamic part f'(p) can be written as a transfer function of unitary static gain:

$$f'(U, X_1, X_2, X_3, \ldots) = \frac{1 + a_1 p + b_1 p^2 + c_1 p^3 \ldots}{1 + a_2 p + b_2 p^2 + c_2 p^3 \ldots}$$

with $a_1, a_2, b_1, b_2, c_1, c_2, \ldots$ function parameters of inputs U, X1, X2, X3 . . . . The elements of the dynamic part are determined either by identification in transitory state or by analysis.

The aim is to reverse the transfer function of the model of the operating law to achieve $F^{-1}(p)$, such that $F(p) \cdot F^{-1}(p) = 1$. Inversion of the transfer function of the model of the operating law poses no problem for what is its dynamic part:

$$f'^{-1}(U, X_1, X_2, X_3, \ldots) = \frac{1 + a_2 p + b_2 p^2 + c_2 p^3 \ldots}{1 + a_1 p + b_1 p^2 + c_1 p^3 \ldots}$$

But with respect to the static part, it can be difficult to reverse it when the function K is complex, contains nonlinearities and/or depends considerably on the input parameters $X_i$.

The solution is to calculate a local gain of the static part of a model of the operating law representative of the gain $\Delta Y$ of the regulated parameter Y in response to a variation $\Delta U$ of the command U in a steady operating state of said operating law:

$$\text{local gain}(U, X_1, X_2, X_3, \ldots) = \frac{\Delta Y}{\Delta U} = K$$

This calculation is performed by a determination module of the local gain, in the core of the computer charged with control of the regulated parameter Y. The determination module of the local gain is configured so that at least with each change of the command U and/or the input parameters $X_i$, a new local gain is determined to reflect said changes. Specifically, the local gain is calculated in real time at each time step of calculation of the regulation control to update said local gain.

It should be noted that inclusion of the sole inversion of the static part achieves a unitary static gain for the regulator—device assembly, and compensation of the dynamic part, is not always needed. This is the case for example when the system has rapid and linear dynamics; in this case regulating of the corrector 6 easily compensates the dynamics without need to reverse the dynamics of the system.

Figure 3:
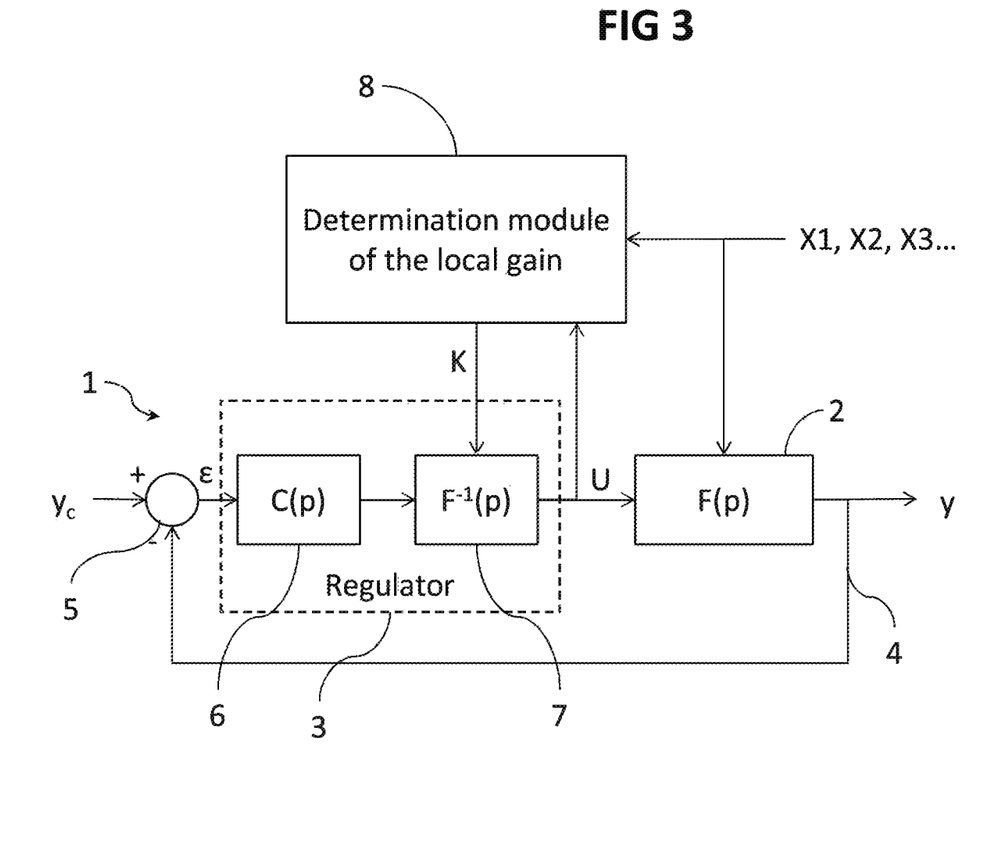

FIG. 3 shows the arrangement of this determination module of the local gain 8 in a system similar to that of FIG. 2. The determination module of the local gain 8 receives at input the input parameters $X_i$, i.e., X1, X2, X3, and the command U, and delivers the local gain to the compensation module 7 of the regulator 3.

More precisely, the determination module of the local gain 8 calculates the local gain from the values taken by the outputs of the static part of a model of the operating law for at least two separate values of the command U in keeping the input parameters constant:

$$\text{local gain}(U, X_1, X_2, X_3, \ldots) = \frac{K(U, X_1, X_2, X_3, \ldots) - K(U + \Delta U, X_1, X_2, X_3, \ldots)}{\Delta U}$$

The two separate values of the command are separated in value by a difference $\Delta U$. This difference $\Delta U$ is selected sufficiently small to remain in the linear field of the static part of the transfer function of the model of the operating law, i.e., it is possible to disregard any non-linearities around the current operating point of the system.

The difference $\Delta U$ between the two separate values of the command U is preferably less than 0.25% of the range of variation in said command U and/or the difference $\Delta U$ between the two separate values of the command U corresponds to a variation in said command U causing a variation $\Delta Y$ in the regulated parameter Y less than 1% of the range of variation in said regulated parameter Y. To the extent where this is in the linear field of the static part, the variation $\Delta Y$ of the regulated parameter can be approximated by:

$$\Delta Y = |K(U, X_1, X_2, X_3, \ldots) - K(U + \Delta U, X_1, X_2, X_3, \ldots)|$$

Once this local gain is determined by the determination module of the local gain 8 it is used by the compensation module 7 of the operating law. More precisely, the module 7 involves the inverse of the local gain. Continuing the preceding notations, the inverse of the transfer function of the model of the operating law can be written as:

$$f^{-1}(p) = \frac{1}{\text{local gain}} f'^{-1}(U, X_1, X_2, X_3, \ldots)$$

or:

$$f^{-1}(p) = \frac{K(U, X_1, X_2, X_3, \ldots) - K(U + \Delta U, X_1, X_2, X_3, \ldots)}{\Delta U} \cdot \frac{1 + a_2 p + b_2 p^2 + c_2 p^3 \ldots}{1 + a_1 p + b_1 p^2 + c_1 p^3 \ldots}$$

Since the transfer function of the compensation module 7 has been prepared to theoretically compensate the transfer function of the model of the device 2, there is $$F^{-1}(p) \cdot F(p) = 1$$

The transfer function C(p) of the corrector 6 can therefore be developed without any consideration for non-linearities of the operating law of the device 2 to ensure that the closed-loop transfer function responds to the need for planned control. The transfer function C(p) of the corrector 6 can be selected for example to admit integration in the regulation loop and thereby ensure deletion of the permanent error on the regulated parameter Y for the setpoint Yc of step type. In this case the choice of gain in, the transfer function C(p) of the corrector 6 controls the closed-loop response to satisfy the requisites of response times, independently of the behavior of the device since its operating law is compensated.

Some transfer functions of the model of the operating law can have particular features to be considered. This is especially the case when the device 2 has hysteresis. This is the case for example of pneumatic valves.

With such a device 2 having hysteresis, during inversion of the direction of command U, the regulated parameter Y reacts only after the command has travelled the hysteresis. From the viewpoint of the corrector 3, this corresponds to a local gain which tends to 0, i.e., in the interval of hysteresis the variation in the command U produces no evolution of the regulated parameter Y. In other words, in the interval of hysteresis, the command U has no effect on the output, i.e. the regulated parameter Y, provided the command U is not outside of the hysteresis.

There is therefore $$K(U, X_1, X_2, X_3, \ldots) - K(U + \Delta U, X_1, X_2, X_3, \ldots) = 0$$

The local gain is therefore zero. However, the local gain being reversed to compensate the gain of the operating law of the device 2, the gain of the compensation module tends to the infinite, corresponding to an infinitely large command U. It can therefore be ensured that the determination module of the local gain is configured to deliver a predetermined saturation value when the local gain calculated by said determination module is below a predefined value, in absolute value.

This saturation value avoids a software exception which would cause division by zero during inversion of the local gain. Next, this saturation value is selected, typically very small, such that once reversed it maximizes the command generated by the regulator 3. This generates a rapid command which allows the course of the interval of hysteresis in a short period. Performance of the control is thereby improved despite the presence of hysteresis.

Another particular feature which can be factored in is for example the presence of a non-invertible part in the transfer function of the model of the operating law. This is for example the case for a pure delay. This non-invertible pan cannot be compensated, but its inclusion in the compensation module 7 of the operating law compensates the invertible part of the model of the operating law.

Figure 4:
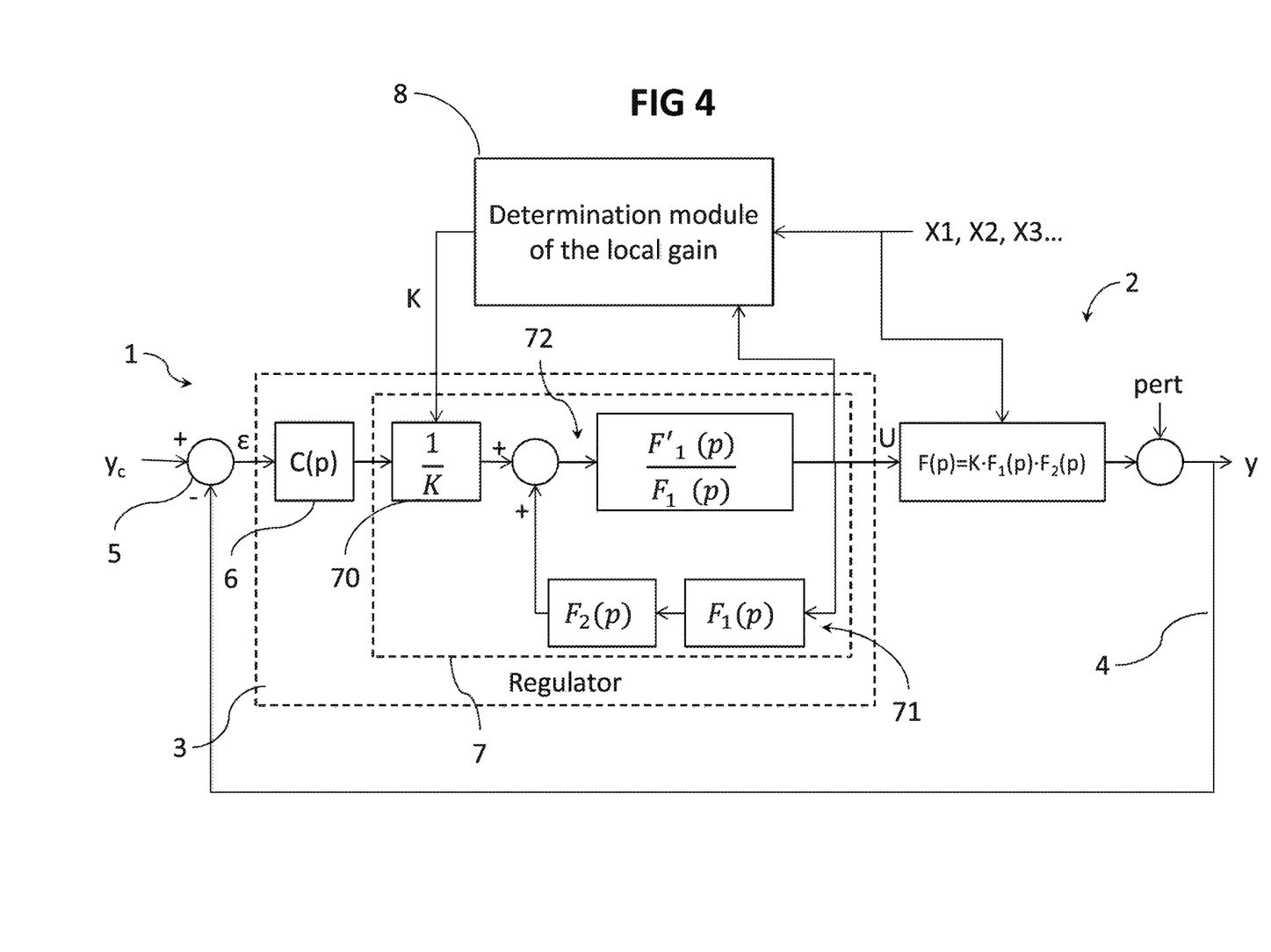

In reference to FIG. 4, this shows an example of inclusion of this non-invertible part in the compensation module 7. $F_1(p)$ is noted the invertible part of the model, $F_2(p)$ the non-invertible part, and K the gain static such that $$F(p)=K \cdot F_1(p) \cdot F_2(p)$$

By way of illustration, the operating law s modelled here by this transfer function added to the perturbations pen.

The compensation module 7 of the operating law comprises first a static compensation 70 which corresponds to the inverse of the local gain K then a dynamic compensation, downstream of the static compensation 70, comprising a forward path 72 and a feedback path 71 constituting a feedback loop. The forward path 72 comprises a transfer function involving the inverse of the invertible part of the model of the operating law. This reverse compensates the invertible part of the model of the operating law. The transfer function of the forward path 72 also comprises a transfer function $F'_1(p)$ corresponding to the dynamics desired for the transfer function in closed loop. In this way, the transfer function of the forward path 72 corresponds to:

$$\frac{F'_1(p)}{F_1(p)}$$

The feedback path 71 comprises the transfer function $F_2(p)$ involving the non-invertible part of the model of the operating law. The feedback path 71 also comprises the transfer function $F_1(p)$ corresponding to the invertible part of the model of the operating law. In this way, the transfer function of the feedback path 71 corresponds to $F_2(p) \cdot F_1(p)$. The output of this feedback path 71 is summed at the output of the static compensation 70 to form the input of the forward path 72, whereof the output is the command U and is also the input of the feedback path 71.

Study of the closed-loop transfer function (CLTF) of this regulation control system reveals its advantages. Calculating the CLTF gives:

$$Y = \frac{C(p) \cdot F_2(p) \cdot F'_1(p)}{1 + F_2(p) \cdot F'_1(p)[C(p) - 1]} Y_c + \frac{pert \cdot [1 - F_2(p) \cdot F'_1(p)]}{1 + F_2(p) \cdot F'_1(p)[C(p) - 1]}$$

In a first case, $F_2(p)=1$, i.e., $F(p)$ is entirely invertible, which corresponds to cases mentioned earlier. The following CLTF is produced:

$$Y = \frac{C(p) \cdot F'_1(p)}{1 + F'_1(p)[C(p) - 1]} Y_c + \frac{pert \cdot [1 - F'_1(p)]}{1 + F'_1(p)[C(p) - 1]}$$

If $C(p)=1$ is selected, the following $$Y = F'_1(p) \cdot Y_e + pert \cdot [1 - F'_1(p)]$$

The corrector 6 therefore imposes the desired dynamics on the whole without static error, and the perturbation can be efficaciously rejected by selecting a rapid dynamic for $F'_1(p)$. The system is of particular interest when the non-invertible part is sufficiently modellable. This is the case for a pure delay.

If Tr is noted as the delay, the transfer function of the pure delay is expressed as:

$$F_2(p) = e^{-Tr \cdot p} \cdot F'_1(p) \cdot Y_e + pert \cdot [1 - e^{-Tr \cdot p} \cdot F'_1(p)]$$

If the delay is known, it does not affect the stability of the CLTF. However, rejection of the perturbation is affected by the delay. However, in case of significant delay it is interesting to select the corrector 6 so as to improve the efficacy of rejection.

The following non-limiting example is given in the event where the device is a turboprop, and the regulated parameter is the rotational speed of the propeller XNP, the command being the pitch of the propeller β. The command β is identified by Beta in FIGS. 6 to 9. The example illustrates the application of the invention for calculation of $F^{-1}(p)$ in reference to FIG. 3, which corresponds to a possible embodiment of the invention.

Table 1 below lists different elements involved in the model of the operating law.

TABLE 1

| Notation | Signification | Unit |
| --- | --- | --- |
| GR | Reduction ratio of the reducer: $\omega_P = \frac{\omega_L}{GR}$ | — |
| $J_P$ | Moment of polar inertia of the propeller | kg · m² |
| $J_L$ | Moment of polar inertia of the LP rotor: power turbine + LP shaft (Low-Pressure) | kg · m² |
| $Pw_P$ | Power (aerodynamic) absorbed by the propeller | W |
| $Pw_{49}$ | Power (aerodynamic) delivered by the power turbine | W |
| $TRQ_P$ | Aerodynamic torque absorbed by the propeller. This is resistant torque. | N · m |
| $TRQ_{49}$ | Aerodynamic torque delivered by the power turbine. This is driving torque. | N · m |
| $\omega_P$ | Rotational speed of the propeller | rad/s |
| XNP | Rotational speed of the propeller | rpm |
| $\omega_L$ | Rotational speed of the LP body | rad/s |
| Beta | Pitch angle of the propeller | degree |

TABLE 1-continued

| Notation | Signification | Unit |
|---|---|---|
| $J_{Tot}$ | $\left(J_L + \dfrac{J_P}{GR^2}\right)GR^2 = J_{Tot}$, Moment of inertia the propeller + power turbine + LP shaft assembly | |
| RCP91 | Propeller power coefficient | |
| DIA91 | DIA91 = propeller diameter | |
| ρ | Air density | Kg/m3 |
| A91 | $A91 = \dfrac{\pi}{4} * DIA91^2 * (1 - (XNU91^2)) =$ traction coefficient | — |
| XNU91 | Hub ratio | — |
| RJ91 | $RJ91 = \dfrac{VTAS * 0.5144444}{DIA91 * \dfrac{XNP}{60}} =$ airspeed coefficient | — |
| VTAS | True Air Speed (airspeed of aircraft) | kts |
| PAMB | Atmospheric pressure | Pascal |
| TAMB | Atmospheric temperature | Kelvin |

The model of the operating law linking β (or Beta) to XNP is first set up. Assuming the simplified expression of the power body connecting XNP to the Low-pressure (LP) Turbine and Propeller torque difference:

$$TRQ_{49} - \frac{TRQ_P}{GR} = \left(J_L + \frac{J_P}{GR^2}\right)\frac{d\omega_L}{dt}$$

however, $$\omega_P = \frac{\omega_L}{GR}$$

Therefore $$TRQ_{49} - \frac{TRQ_P}{GR} = \left(J_L + \frac{J_P}{GR^2}\right)GR\frac{d\omega_p}{dt}$$

The aim is to disclose the power term:

$$GR \cdot TRQ_{49} - TRQ_P = \left(J_L + \frac{J_P}{GR^2}\right)GR^2\frac{d\omega_p}{dt}$$

$$\omega_p \cdot GR \cdot TRQ_{49} - \omega_p \cdot TRQ_P = \left(J_L + \frac{J_P}{GR^2}\right)GR^2 \cdot \omega_p \cdot \frac{d\omega_p}{dt}$$

This is posited $$\left(J_L + \frac{J_P}{GR^2}\right)GR^2 = J_{Tot}$$

The result is $$Pw_{49} - Pw_P = J_{Tot} \cdot \omega_p \cdot \frac{d\omega_p}{dt}$$

with $Pw_p$ (given by the manufacturer of the propeller) such that $$Pw_p = 10^{-3} * RCP91 * \rho * \left(DIA91 * \frac{XNP}{60}\right)^3 * A91$$

K2 is kept constant:

$$K2 = 10^{-3} * \rho * \left(\frac{DIA91}{60}\right)^3 * A91$$

with A91 the constant traction coefficient $$A91 = \frac{\pi}{4} * DIA91^2 * (1 - XNU91^2)$$

and RCP91 the propeller power coefficient defined by the manufacture:

[RCP91]=f(Beta,RJ91,VTAS)

with RJ91 being the airspeed coefficient (see table 1). Therefore, $$Pw_p = K2 * RCP91 * \rho * \left(\frac{XNP}{60}\right)^3$$

Figure 5:
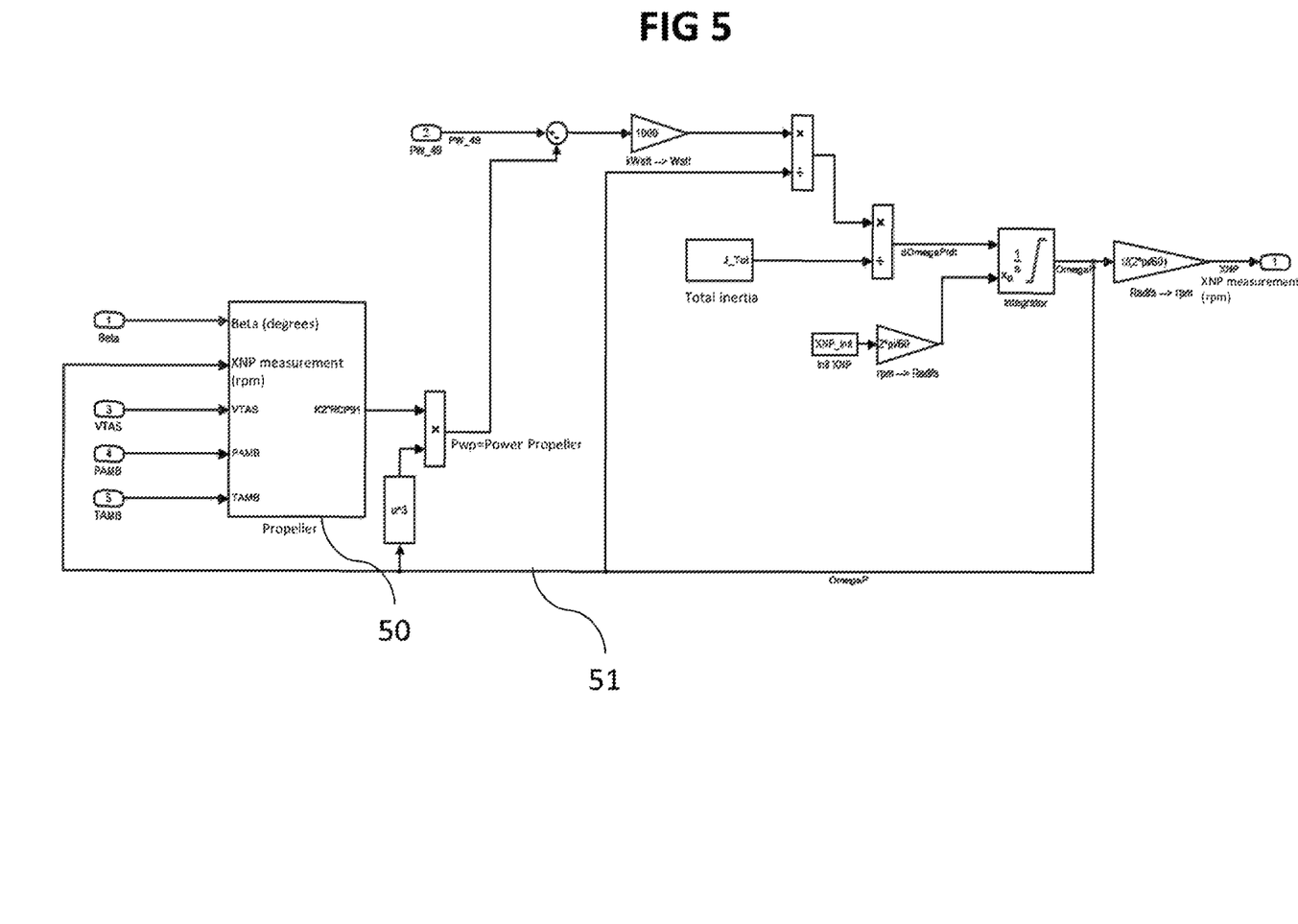
FIGS. 5 to 9 are drawings illustrating an exemplary embodiment of the invention.

A model of the evolution of the speed of the propeller of a turboprop shown in FIG. 5 is achieved, in which the block 50 correspond to calculation of the product of the constant K2 by the propeller power coefficient RCP91. This product is multiplied by the rotational speed of the propeller $\omega_P$ (OmegaP) previously calculated, and cubed. A loop back 51 illustrates the inclusion of the rotational speed of the propeller by the block 50 and by the cubic function. The power absorbed by the propeller $Pw_p$ is achieved as a function of the command β, of the measurement of the rotational speed of the propeller, via the loop back 51, and input parameters comprising the advancement speed of the aircraft VTAS, the ambient pressure PAMB and the ambient temperature TAMB. This power absorbed by the propeller $Pw_p$ is subtracted from another input parameter constituted by the power delivered by the power turbine $Pw_{49}$. Specific to the example illustrated, and linked to the units used, the units are to be converted by certain magnitudes. In this way, the kilowatts of $Pw_p$ and $Pw_{49}$ are converted to watts. The result is divided by the speed $\omega_P$, then by the total inertia $J_{\_Tot}$. This result is then integrated by initializing with an initial speed $XNP_{Init}$, converted previously from rpm in rad/s. The result after integration is the speed XNP, reconverted from rad/s in rpm.

This transfer function is simplified so as to reveal a low-pass system of order 1, representative of the dynamic of the propeller, whereof the time constant Tau_propeller is variable as a function of inputs, and therefore the gain corresponds to the steady part of the rotational speed XNP_Stab:

$$XNP = XNP\_Stab \cdot \frac{1}{1 + Tau\_propeller \cdot P}$$

Figure 6:
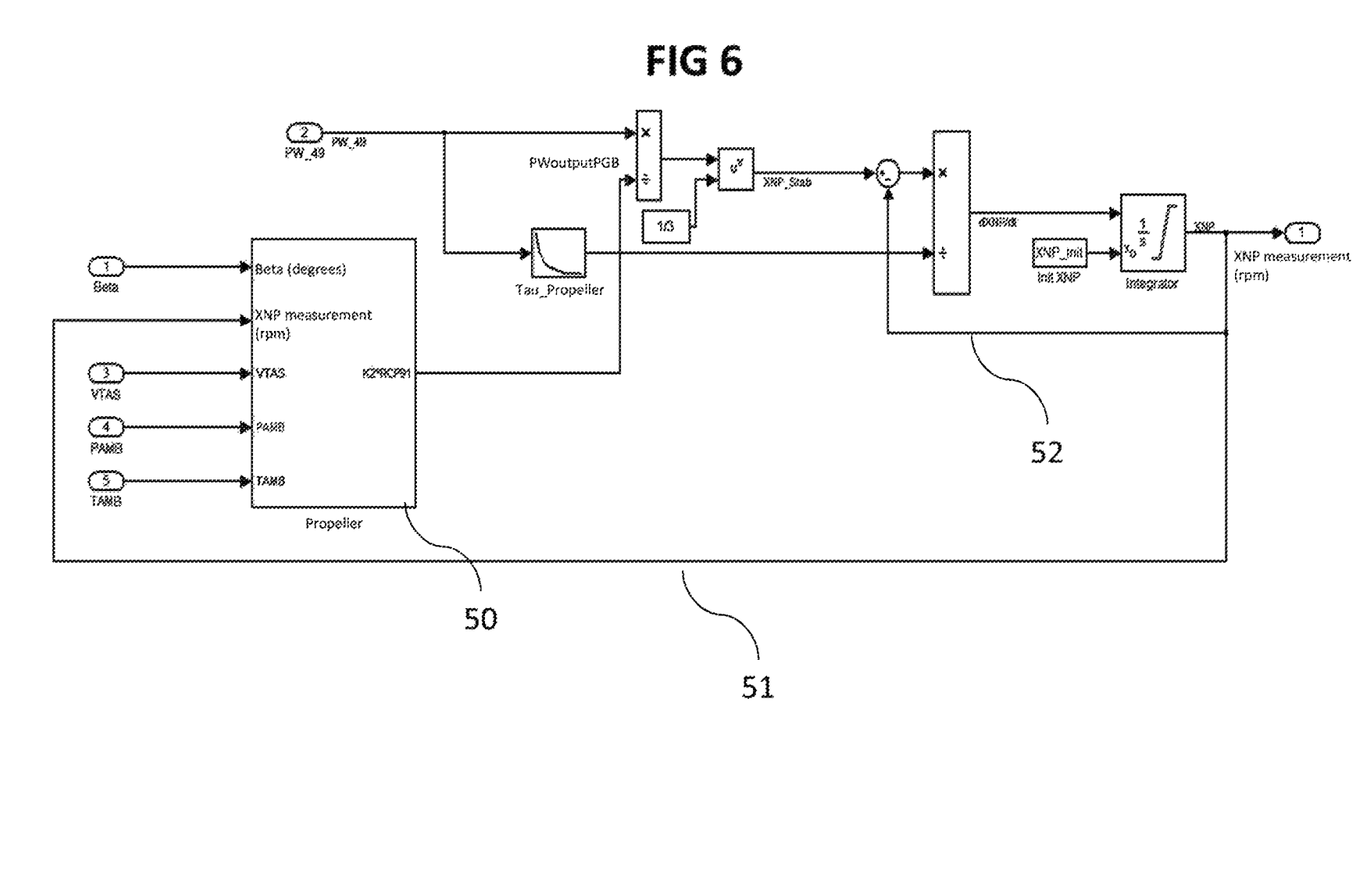

FIG. 6 illustrates this modified transfer function. Relative to FIG. 5, the disappearance of the inclusion of the rotational speed of the propeller is noted on output from the block 50, via the loop back 51 and the cubic function. Instead, the product of the constant K2 by the propeller power coefficient RCP91 corresponds to the power absorbed by the propeller $P_{wp}$ which divides the power delivered by the power turbine $Pw_{49}$, and a cubic root function is applied to the result to give the steady part of the rotational speed XNP_Stab.

The measurement of the rotational speed XNP is subtracted from the steady part of the rotational speed XNP_Stab via a loop back 52. The result is divided by Tau_propeller, then integrated by initializing with an initial speed $XNP_{Init}$ selected at zero, to give the measurement of the rotational speed $XNP_{measurement}$ in rpm.

The transformation of the transfer function isolates the stabilized relationship between the inputs and the rotational speed in steady XNP_Stab, from the transitory relationship. The steady relationship is calculated directly from the model transformed in this way, but the analytical expression of the time constant of the first order low-pass system is not possible. The time constant Tau_propeller is approximated as being a function of PW49 by identifying the dynamics of XNP by conventional identification methods such as application of a level of power input and by measuring. This approximation is sufficiently faithful to enable the synthesis of $F^{-1}(p)$ for control of the propeller.

Calculation of the local gain is set up as explained earlier by calculating from the static part of the model the values of XNP for current β and for β+Δβ. For example, Δβ=0.1° can be selected so as not to depart from the scope of linearity around the current operating point.

Figure 7:
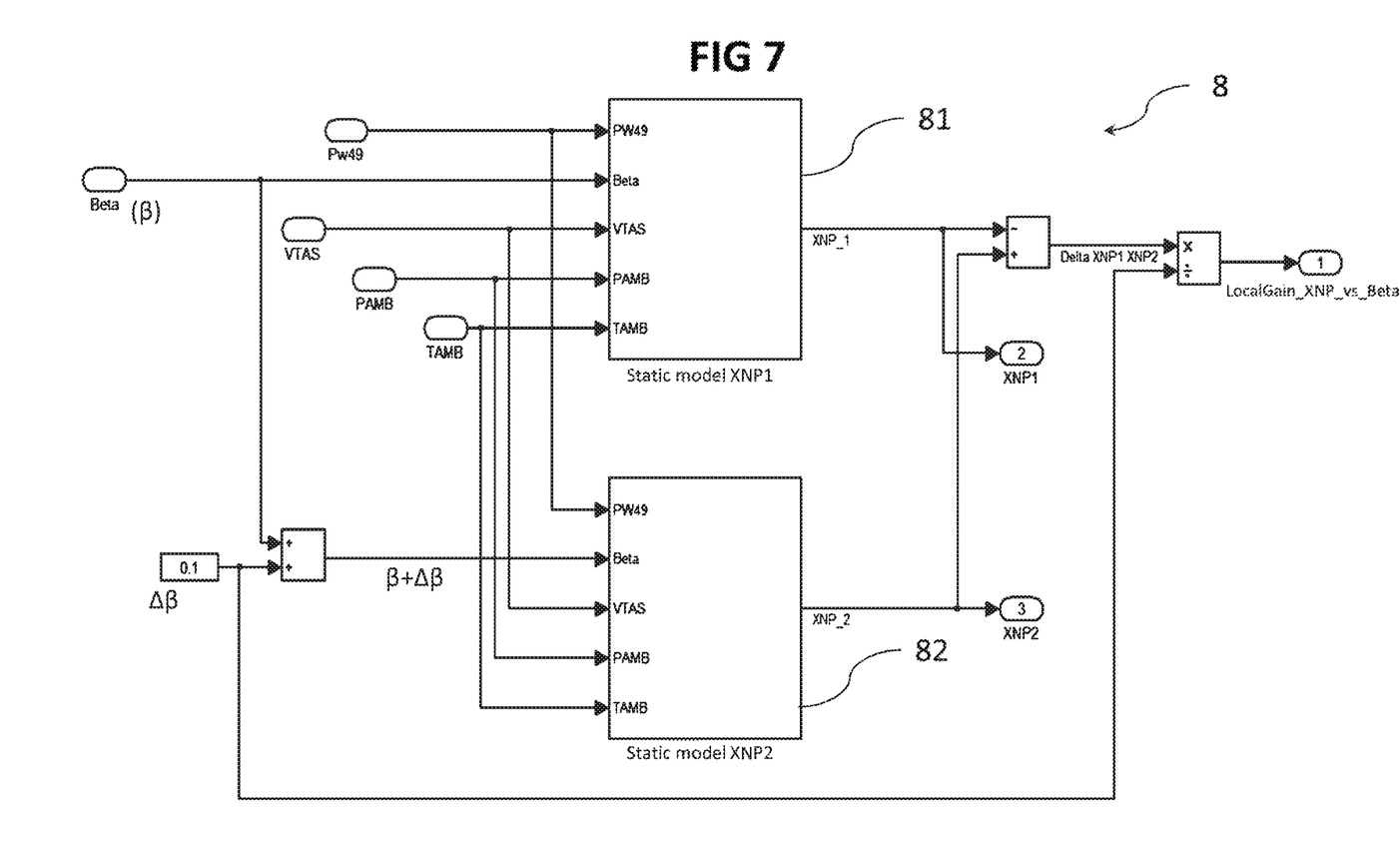

FIG. 7 illustrates implementation of the calculation of the local gain such as can be done in a real-time computer. This therefore relates to the determination module 8 of the local gain. The two blocks 81, 82 in parallel input the measurement of the rotational speed of the propeller $\omega_P$ (OmegaP) the advancement speed of the aircraft VTAS, the ambient pressure PAMB, the ambient temperature TAMB, and the power delivered by the power turbine $Pw_{49}$. The block 81 from above, noted Static Model XNP1, takes β as command while the block 82 from below, noted Static Model XNP2, takes β+Δβ as command, and therefore deliver two values of XNP, noted XNP1 and XNP2. These are therefore blocks illustrating the static model of the operating law. After having made the difference between XNP1 and XNP2, and after division by Δβ, the result is the value of the local gain, noted local gain XNP vs Beta.

Figure 8:
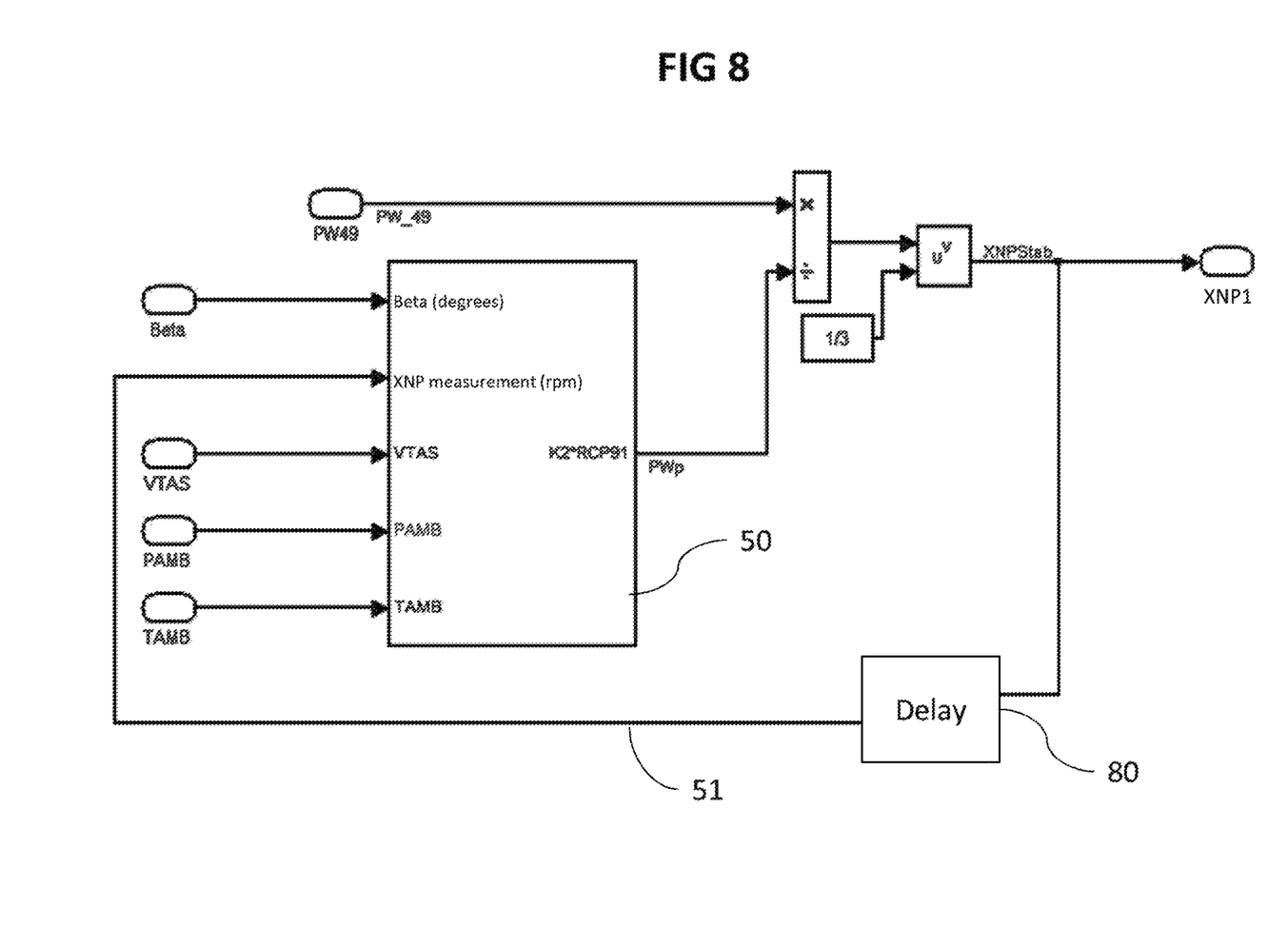

FIG. 8 illustrates the static part of the model of the operating law schematized by the blocks 81, 82 in FIG. 7, in this case that of the block 81 from above, disclosing the block 50 shown in FIG. 5. This is in fact the static part of the transfer function illustrated by FIG. 6: the dynamic part involving the Tau_Propeller and the integrator has been deleted. Introduction of a delay 80 of a calculation pitch on the loop back 51 of the measurement of the XNP is also noted, so that measuring the preceding calculation pitch is considered by replacement of the integration.

Figure 9:
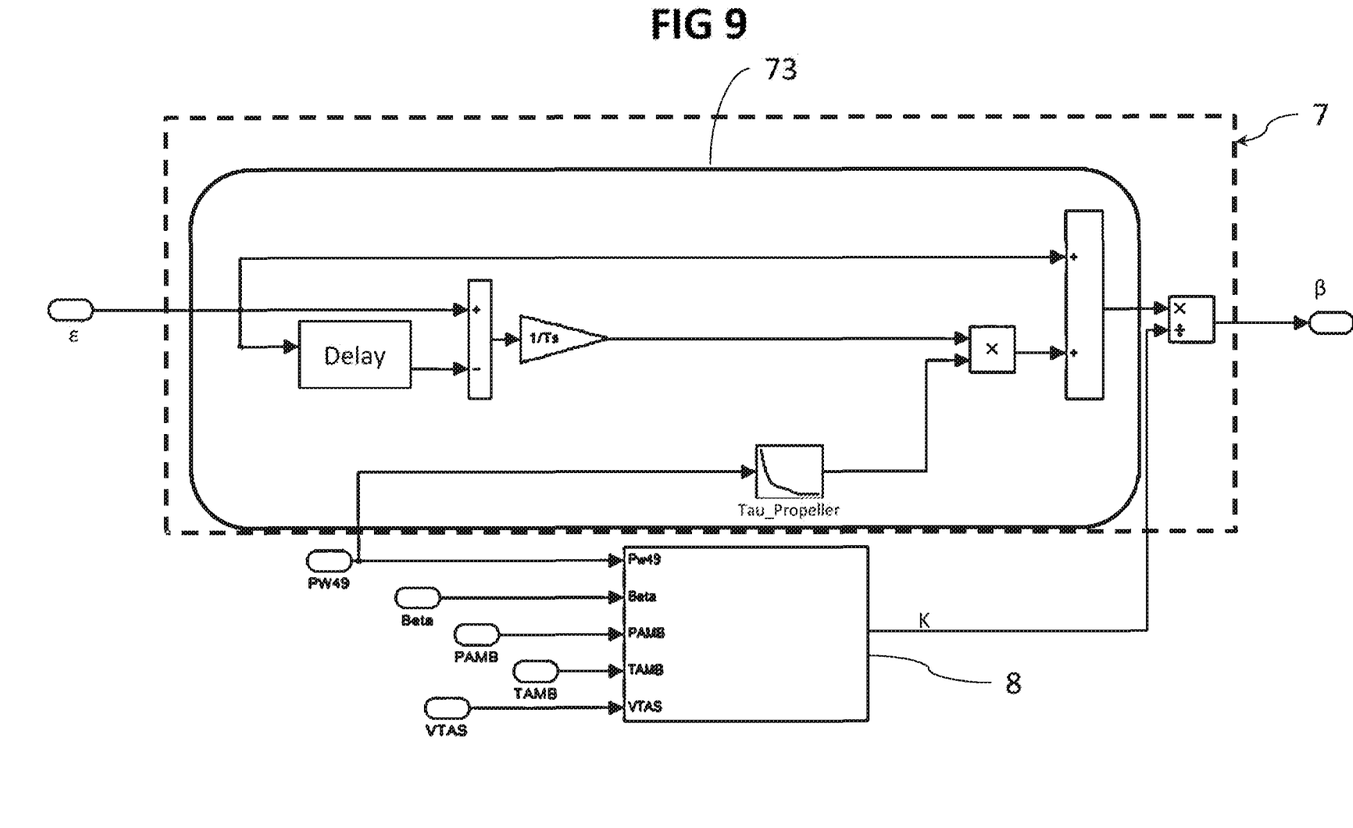

Complete compensation of the model of the operating law linking XNP to β is finally made by reversing the local gain and the low-pass filter of order 1 corresponding to the dynamic of the system, as illustrated in FIG. 9. This shows the determination module 8 of the local gain K illustrated by FIG. 7, and the compensation module 7 of the operating law, via the high-pass filter 73 constituting the inverse of the dynamic part (identified at a low-pass) divided by the local gain K determined by the module 8. On input of the first order high-pass filter 73, ε is the difference between a setpoint of rotational speed XNP and measurement of the rotational speed XNP. In the high-pass filter 73, the difference is made between the current ε and ε previously calculated, symbolized by the delay. This difference is divided by Ts, representing a part of the time constant. The result is multiplied by Tau_Propeller, then added to ε. The output of the high-pass filter 73 is divided by the local gain K calculated by the module 8, resulting in the command β to be applied.

The invention is not limited to the embodiment described and shown in the appended figures. Modifications are still possible, especially from the viewpoint of the constitution of various elements or by substitution of technical equivalents, without as such departing from the scope of protection of the invention.

The invention claimed is:
1. An assembly comprising:
an aircraft propulsion device and a regulation control system for controlling a regulated parameter of the aircraft propulsion device,
wherein the regulation control system is connected to the aircraft propulsion device and the regulation control system is configured to send a command to the aircraft propulsion device to control the regulated parameter of the aircraft propulsion device, said command acting on a regulating variable of the aircraft propulsion device to control the regulated parameter, the regulated parameter being a physical magnitude, said regulated parameter being governed by an operating law of said aircraft propulsion device linking said regulated parameter to a command and to a plurality of input parameters, said operating law being modellable by a transfer function constituting a mathematical model of a relationship between the command, the input parameters, and the regulated parameter, said regulation control system comprising a regulation loop servo-controlling said regulated parameter at a setpoint by the command controlling the aircraft propulsion device, wherein the regulation loop comprises a regulator comprising in series a corrector and a compensation module of the operating law whereof a transfer function is intended to compensate the transfer function of the operating law, wherein the command being delivered to the aircraft propulsion device by the regulation control system corresponds to an output of the regulator, wherein the regulation control system further comprises a determination module of a local gain receiving the command and the input parameters, and configured to determine a local gain of a static part of a model of the operating law representative of a gain of said regulated parameter in response to a variation of said command in a steady operating state of said operating law, said static part of the model of the operating law combining time-independent relations between the regulated parameter, the command and the plurality of input parameters, said model of the operating law also comprising a dynamic part combining time-dependent relations between the regulated parameter, the command and the plurality of input parameters, said compensation module of the operating law involving an inverse of said local gain determined by the determination module.

2. The assembly of claim 1, wherein the local gain is calculated from the values taken by the outputs of a static part of a model of the operating law for at least two separate values of the command in keeping the input parameters constant.

3. The assembly of claim 2, wherein the difference between the two separate values of the command is less than 0.25% of the range of variation in said command and/or the difference between the two separate values of the command corresponds to a variation in said command causing a variation in the regulated parameter less than 1% of the range of variation in said regulated parameter.

4. The assembly of claim 1, wherein the determination module of the local gain is configured to deliver a predetermined saturation value when the local gain calculated by said determination module is below a predefined value.

5. The assembly of claim 1, wherein the determination module of the local gain is configured so that at least with each change of the command and/or the input parameters, a new local gain is determined to reflect said changes.

6. The assembly of claim 1, wherein the compensation module of the operating law also comprises a first transfer function of an inverse of the dynamic part of the model of the operating law.

7. The assembly of claim 1, wherein the model of the operating law comprises an invertible part and a non-invertible part, and the compensation module of the operating law comprises a static compensation which corresponds to the inverse of the local gain and a dynamic compensation comprising a forward path and a feedback path constituting a feedback loop, wherein the forward path comprises a second transfer function involving the inverse of the invertible part of the model of the operating law and the feedback path comprises a third transfer function involving the non-invertible part of the model of the operating law.

* * * * *

UNITED STATES PATENT AND TRADEMARK OFFICE
CERTIFICATE OF CORRECTION

PATENT NO. : 10,625,873 B2
APPLICATION NO. : 15/752628
DATED : April 21, 2020
INVENTOR(S) : Cedrik Djelassi It is certified that error appears in the above-identified patent and that said Letters Patent is hereby corrected as shown below:

In the Specification

In Column 1, Line 57, delete "b" and insert -- by --.

In Column 2, Line 15, delete "law," and insert -- law --.

In Column 2, Line 24, delete "aid" and insert -- said --.

In Column 2, Line 48, delete "pan" and insert -- part --.

In Column 2, Line 66, delete "illustrating," and insert -- illustrating --.

In Column 3, Line 43, delete "$F^1(p)$." and insert -- $F^{-1}(p)$. --.

In Column 5, Lines 2-3, delete "nonlinearities" and insert -- non-linearities --.

In Column 5, Line 20, delete "deter mined" and insert -- determined --.

In Column 5, Line 57, delete "andlor" and insert -- and/or --.

In Column 6, Line 28, delete "Yc" and insert -- $Y_c$ --.

In Column 6, Line 29, delete "in," and insert -- in --.

In Column 7, Line 4, delete "pan" and insert -- part --.

In Column 7, Line 14, delete "law s" and insert -- law is --.

In Column 7, Line 15, delete "pen." and insert -- pert. --.

Signed and Sealed this
Twenty-second Day of September, 2020

Andrei Iancu
*Director of the United States Patent and Trademark Office*

CERTIFICATE OF CORRECTION (continued)
U.S. Pat. No. 10,625,873 B2

In Column 7, Line 27, delete "closed loop" and insert -- closed-loop --.

In Column 8, Line 15-20, delete "$Y=F'_1(p) \cdot Y_e + \text{pert} \cdot [1-F'_1(p)]$" and insert
-- $Y = F'_1(p) \cdot Y_c + pert \cdot [1 - F'_1(p)]$ --.

In Column 8, Line 27-30, delete "$F_2(p)=e^{-Tr \cdot p} \cdot F'_1(p) \cdot Y_e + \text{pert} \cdot [1-e^{-Tr \cdot p} \cdot F'_1(p)]$" and insert
-- $F_2(p) = e^{-Tr \cdot p} \cdot F'_1(p) \cdot Y_c + \text{pert} \cdot [1 - e^{-Tr \cdot p} \cdot F'_1(p)]$ --.